United States Patent Office 3,823,162
Patented July 9, 1974

3,823,162
6,7-EPOXYGERANYL ETHERS OF OXYGEN HETEROCYCLIC COMPOUNDS
Edward Koon Wah Wat, Wilmington, Del., assignor to E. I. du Pont de Nemours and Company, Wilmington, Del.
No Drawing. Filed Mar. 2, 1972, Ser. No. 231,394
Int. Cl. C07d 13/04, 15/04
U.S. Cl. 260—340.7     4 Claims

ABSTRACT OF THE DISCLOSURE 6,7-Epoxygeranyl ethers of the formula

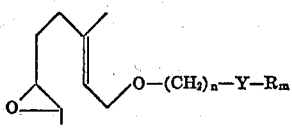

wherein
n=0 to 3
Y=5 or 6 membered di- or trivalent heterocyclic group containing up to 2 atoms of oxygen and up to 1 atom of sulfur;
R= hydrogen, alkyl, perchloroalkyl or alkoxy of up to 4 carbons; and
m=1 or 2;
are modifiers of insect growth and development.

BACKGROUND OF THE INVENTION

Field of the Invention

This invention concerns certain 6,7-epoxygeranyl ethers and their use to control the growth and development of harmful insects.

Prior Art

Dutch patent application 69/10,519 opened for inspection on October 13, 1970, Bowers, U.S. Pat. 3,563,982, and Science 164, 323 (1969), disclose certain aromatic ethers of 6,7-epoxygeraniol as insect control agents. They are not the same as the compounds of this invention.

Description of the Invention

It has now been found that certain oxygen heterocyclic ethers, namely, 6,7-epoxygeranyl ethers of the formula

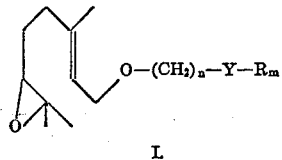

I in which
n is 0 to 3;
Y is a 5- or 6-membered di- or trivalent heterocyclic group containing up to 2 atoms of oxygen and up to 1 atom of sulfur;
R is hydrogen, alkyl, perchloroalkyl, or alkoxy, each containing up to 4 carbon atoms; and
m is 1 or 2;

are capable of interfering with the normal growth and development of harmful insects.

The preparation of the compounds is exemplified by the reaction of 2-methyl-4-hydroxymethyl-1,3-dioxolane with 6,7-epoxygeranyl bromide:

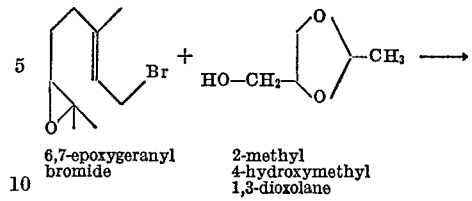

6,7-epoxygeranyl bromide    2-methyl 4-hydroxymethyl 1,3-dioxolane

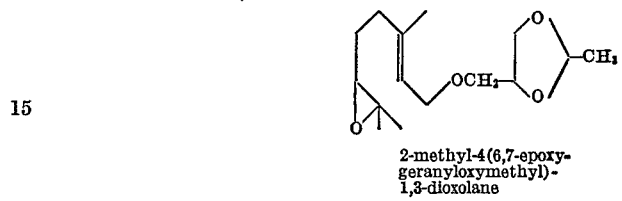

2-methyl-4(6,7-epoxygeranyloxymethyl)-1,3-dioxolane

The intermediate geranyl bromide is preferably prepared by the method of Wagner-Jauregg and Arnold [Ann. 529, 274 (1937)]. Technical grade geraniol can be used but the low yields usually obtained make it preferable to employ a high grade of geraniol. This leads to a geranyl bromide of sufficient purity to be used directly in the next synthesis step.

The crude geranyl bromide prepared by the preferred procedure above is epoxidized by reaction with m-chloroperbenzoic acid following the procedure of F. M. Pallos et al. [Nature, 232, 486 (1971)].

The procedure of H. S. Hill et al. [J. Am. Chem. Soc. 50, 2242 (1928)] was followed to obtain a mixture of 2-methyl-4-hydroxymethyl-1,3-dioxolane and 2-methyl-5-hydroxy-1,3-dioxane. These were separated by converting the alcohol mixture to the benzoate derivative, using benzoyl chloride and pyridine. Crystallization from petroleum ether (30–60°) gave a solid benzoate, m.p. 80–85° C., and an oily benzoate. There were numerous differences in the IR and NMR spectra.

Each ester was saponified with sodium hydroxide in water at 70–80° C. The solid benzoate gave rise to 2-methyl-5-hydroxy-1,3-dioxane, b.p. 64–65° C. (10 mm.); IR (film), 2.90μ (OH); NMR (CDCl₃), δ4.74 (q, 1, J=5, OCHMeO), 3.92 (m, 4, CH₂O), 3.57 (m, 2, CHOH), 1.31 (d, 3, J=5, CH₃).

The liquid benzoate gave 2-methyl-4-hydroxymethyl-1,3-dioxolane, b.p. 78–83° C. (10 mm.); IR (film), 2.90μ (OH); NMR (CDCl₃), δ4.9–5.3 (m, 1, OCHMeO), 2.8–4.4 (m, 6, CH₂O, CHOH), 1.3–1.5 (m, 3, CH₃).

Synthesis of intermediates in preparing the compounds of the various examples, as in Examples 10–19, is given herewith.

A. 2,2-dimethyl-1,3-dioxolane-4-methanol (I).

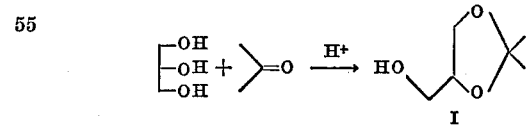

The preparation described in Organic Synthesis, Coll. Vol. III, p. 502 was modified slightly in that a Soxhlet extractor filled with 3A molecular sieves was used to remove water. The product is exclusively dioxolane I, uncontaminated by isomeric dioxane. Yield—87%, b.p. 79–80° (13 mm.).

B. 2,2-Dimethyl-1,3-dioxolane-4-methyl Acetate (II).

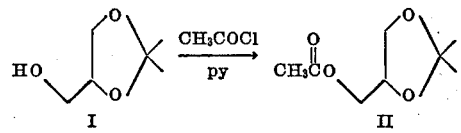

The alcohol I was acetylated as follows: Acetyl chloride (160 g.) was added over a period of 1 hr. to a solution of 254 g. of the ketal I in 160 g. of pyridine and 750 ml. of benzene while keeping the reaction mixture at 0–5° by ice-cooling. After 3 hr. at 0°, the mixture was filtered and the solids were promptly washed with benzene. The filtrate was concentrated and the residual oil was distilled to give 321 g. of liquid, b.p. 79–81° (11 mm.), 96% yield; IR (film)—5.74μ (C=O); NMR (CDCl₃): δ3.5–4.4 (m, 5, CH₂O, CHO), 2.03 (s, 3, CH₃CO), 1.39, 1.31 (2s, 6, CH₃).

C. 2-t-Butyl-1,3-dioxolane-4-methyl Acetate (III)

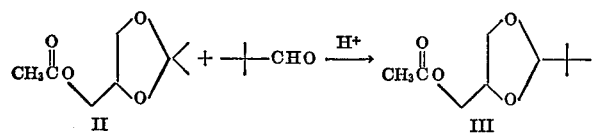

The following is an example of the exchange reaction which has been used with a number of aldehydes to give dioxolanes such as III.

A mixture of 19.1 g. of the acetate II, 35 g. of pivaldehyde, 0.5 g. of p-toluenesulfonic acid hydrate, and 100 ml. of benzene was refluxed for 5 hr. The solution was washed with sat'd sodium bicarbonate solution, dried over potassium carbonate, and distilled to give 18.4 g. (83% yield) of liquid, b.p. 97–98° (11 mm.), IR (film) 5.71μ (C=O); NMR (CDCl₃); δ4.67, 4.59 S2s, 1 (cis, trans), OCHtBuO], 3.6–4.3 (m, 5, CH₂O, CHO), 2.10 (s, 3, CH₃CO), 0.92 [s, 9, C(CH₃)₃].

D. 2-t-Butyl-1,3-dioxolane-4-methanol (IV)

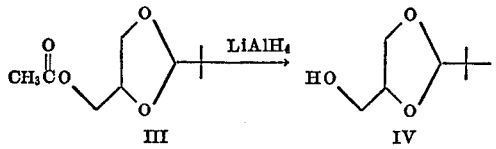

The acetate group can be removed by basic hydrolysis but the hydride reduction procedure is preferred because non-aqueous work-up is used.

To a suspension of 2.0 g. of lithium aluminum hydride in 50 ml. of THF was added 16.5 g. of the acetate III at 0–10°. After 30 min. at 0°, 2.0 ml. of water is cautiously added, followed by 2.0 ml. of 15% aq. sodium hydroxide, and 6.0 ml. of water. The solids were removed by filtration and were thoroughly washed with ether. Distillation of the filtrate gave 11.6 g. of liquid, b.p. 87–89° (11 mm.), 89% yield, IR (film)—2.9μ (OH); NMR (CDCl₃)—2s(1H) 4.69, 4.60δ (OCHtBuO); m(5H) 3.5–4.3 (CH₂O, CHO); m(1H) 2.7 (OH); s(9H) 0.96 (C(CH₃)₃).

The above sequence was applied to the examples in which the 2-substituent was: iso-butyl, sec-butyl, t-butyl, diethyl, ethyl, and also to the oxathiolane example 20 where the starting material was 3-mercaptopropan-1,2-diol.

SPECIFIC EMBODIMENTS OF THE INVENTION

In the following examples, which are illustrative and not limitative, all parts and percentages are by weight unless specified otherwise.

EXAMPLE 1

2-Methyl-4(6,7-epoxygeranyloxymethyl)-1,3-dioxolane

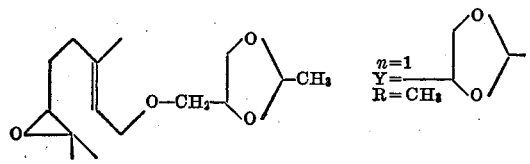

To a solution of 9.4 g. (80 mmol) of 2-methyl-4-hydroxymethyl-1,3-dioxolane in 50 ml. of tetrahydrofuran (THF) at −70° C. was added 50 ml. of 1.6M solution of n-butyllithium in hexane. The mixture was stirred at −70° C. for 15 minutes and then 16.0 g. of crude 6,7-epoxygeranyl bromide was added. The mixture was stirred at 25° C. for 22 hours and at 50° C. for 4 hours. The reaction mixture was poured into water and the product extracted into ether. The combined ether extracts were dried over potassium carbonate and concentrated under reduced pressure. Partial evaporative distillation at 70° C./0.02 mm. yielded some unreacted epoxygeranyl bromide. Further distillation at 90° C./0.02 mm. gave 5.61 g. of 2 - methyl-4-(6,7-epoxygeranyloxymethyl)-1,3-dioxolane: IR (film) 5.95μ (C=C), 11.5μ (epoxide); NMR (CDCl₃), δ5.43 (m, 1, vinyl), 5.10 (m, 1, OCHCH₃O), 3.7–4.3 (m, 5, CH₂O, CHO), 3.3–3.6 (m, 2, CH₂O), 2.7 (t, 1, J=6, epoxide H), 2.0–2.4 (m, 2, allylic CH₂), 1.71 (m, 5, allylic CH₃, epoxide CH₂), 1.2–1.5 (m, 9 epoxide CH₃, OCCH₃O); tlc, single spot on silica gel, 3:1 benzene:ether.

EXAMPLE 2

2-(6,7-Epoxygeranyloxymethyl) tetrahydrofuran

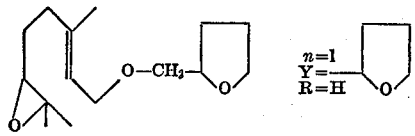

The procedure of Example 1 was followed using 8.15 g. (80 mmol) of tetrahydrofurfuryl alcohol in place of the 2-methyl-4-hydroxymethyl-1,3-dioxolane. The product was isolated by column chromatography on Florisil, followed by evaporation distillation at 100° C./0.04 mm.: IR (film), 5.98μ (C=C), 11.4μ (epoxide); NMR (CDCl₃), δ5.42 (m, 1, vinyl H), 3.7–4.2 (d+m, 5, CH₂O, CHO), 3.41 (d, 2, J=5, CH₂O), 2.70 (t, 1, J=6, epoxide H), 1.5–2.4 (m, 11), 1.26, 1.22 (2s, 6, epoxide CH₃).

EXAMPLE 3

2-Ethyl-4-(6,7-epoxygeranyloxymethyl)1,3-dioxolane

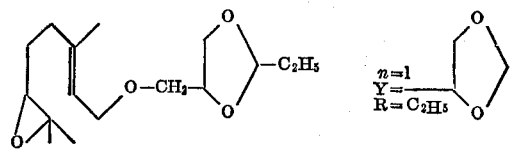

The procedure of Example 1 was applied to 10.6 g. (80 mmol) of 2-ethyl-4-hydroxymethyl-1,3-dioxolane in place of the 2-methyl homolog. In addition, 10 ml. of hexamethylphosphoramide was used as cosolvent and no heating was required. The product, 5.7 g. of 2-ethyl-4-(6,7-epoxygeranyloxymethyl)-1,3-dioxolane, was obtained by evaporative distillation at 115° C. (0.04 mm.); IR (film), 6.00μ (C=C); 11.5 (epoxide); NMR (CDCl₃), δ5.41 (m, 1, vinyl H); 4.9 (m, 1, OCHEtO); 3.3–4.3 (m, 7, CH₂O, CHO); 2.69 (t, 1, J=7, epoxide H); 1.27, 1.22 (2s, 6, epoxide CH₃); 0.92 (t, 3, J=7, CH₃).

Using the procedure of Example 1, the following heterocyclic alcohols were reacted with 6,7-epoxygeranyl bromide under the conditions shown to give compounds of the invention wherein the values for n, Y and R are as indicated.

TABLE I

| Example | Structure | Heterocyclic Alcohol | Distillation temperature, °C. | n | Y | R | m |
|---|---|---|---|---|---|---|---|
| 4 |  | 5-hydroxy-2-ethyl-1,3-dioxane | 120 (0.03 mm.) | 0 | 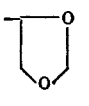 | $C_2H_5$ | 1 |
| 5 | 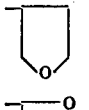 | 4-hydroxymethyl-2,2-dimethyl-1,3-dioxolane | 100 (0.04 mm.) | 1 | 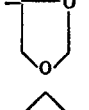 | $(CH_3)_2$ | 2 |
| 6 | 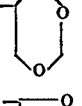 | 3-hydroxytetrahydrofuran | 90 (0.04 mm.) | 0 | 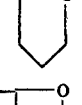 | H | 1 |
| 7 | 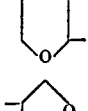 | 4-hydroxymethyl-1,3-dioxolane | 105 (0.07 mm.) | 1 | 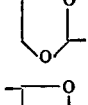 | H | 1 |
| 8 | 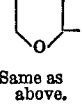 | 5-hydroxy-1,3-dioxane | 105 (0.04 mm.) | 0 |  | H | 1 |
| 9 | 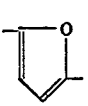 | 2-(3-hydroxypropyl)tetrahydrofuran | 120 (0.05 mm.) | 3 | 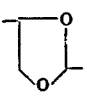 | H | 1 |
| 10 | HOCH₂—structure—$C_3H_7$-i | 4-hydroxymethyl-2-isopropyl-1,3-dioxolane | 115 (0.05 mm.) | 1 | 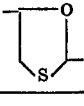 | $i$-$C_3H_7$ | 1 |
| 11 | HO—structure—$C_3H_7$-i | 5-hydroxy-2-isopropyl-1,3-dioxane | 120 (0.03 mm.) | 0 | | $i$-$C_3H_7$ | 1 |
| 12 | HOCH₂—structure—CCl₃ | 4-hydroxymethyl-2-trichloromethyl-1,3-dioxolane | 125 (0.0008 mm.) | 1 | | $CCl_3$ | 1 |
| 13 | HOCH₂—structure—$C_3H_7$-n | 4-hydroxymethyl-2-propyl-1,3-dioxolane | 110 (0.03 mm.) | 1 | Same as above. | $n$-$C_3H_7$ | 1 |
| 14 | HO(CH₂)₂—structure—$C_2H_5$ | 4-(2-hydroxyethyl)-3-ethyl-1,3-dioxolane | 110 (0.004 mm.) | 2 | ...do....... | $C_2H_5$ | 1 |
| 15 | HOCH₂—structure—CHC₂H₅/CH₃ | 4-hydroxymethyl-2-sec-butyl-1,3-dioxolane | 115 (0.03 mm.) | 1 | ...do....... | CHC₂H₅/CH₃ | 1 |
| 16 | HOCH₂—structure—CH₂CH(CH₃)₂ | 4-hydroxymethyl-2-isobutyl-1,3-dioxolane | 115 (0.03 mm.) | 1 | ...do....... | $CH_2CH(CH_3)_2$ | 1 |
| 17 | HOCH₂—structure—C(CH₃)₃ | 4-hydroxymethyl-2-tert-butyl-1,3-dioxolane | 110 (0.03 mm.) | 1 | ...do....... | $C(CH_3)_3$ | 1 |
| 18 | HOCH₂—structure—$C_2H_5$ | 2-hydroxymethyl-5-ethyl-furan | 115 (0.03 mm.) | 1 | furan ring | $C_2H_5$ | 1 |
| 19 | HOCH₂—structure—$(C_2H_5)_2$ | 4-hydroxymethyl-2,2-diethyl-1,3-dioxolane | 115 (0.03 mm.) | 1 | | $(C_2H_5)_2$ | 4 |
| 20 | HOCH₂—structure—$C_2H_5$ | 5-hydroxymethyl-2-ethyl-1,3-oxathiolane | 120 (0.03 mm.) | 1 | O/S ring | $C_2H_5$ | 1 |

The compounds of the invention have activity as juvenile hormone mimics in certain harmful insects and therefore have utility as insect control agents.

*Tenebrio* (yellow mealworm assay). *Tenebrio molitor* is a beetle which infests stored grain and is a commonly used test species. The compound is dissolved in acetone and the solution is applied to the abdomen of a young pupa from which the adult insect develops. The $ED_{50}$ is the amount of compound necessary to severely deform half of the test animals used. These insects will not live or reproduce.

*Aedes aegypti* (mosquito). The compound is dissolved or suspended in water and newly hatched larvae are reared in the medium. Suppression of adult emergence is the criterion of activity. The $EC_{50}$ is the concentration at which only 50% of the larvae emerge as adults.

Biological activity is given in Table II.

TABLE II

| Compound of Example | Tenebrio $ED_{50}$, μg. | Other data |
|---|---|---|
| 1 | 0.0053 | Granary weevil—100% control at 1,000 p.p.m.; confused flour beetle—88% control at 1,000 p.p.m. |
| 2 | 2.2 | Granary weevil—77% control at 1,000 p.p.m.; confused flour beetle—72% control at 1,000 p.p.m. |
| 3 | 0.00066 | Mosquito $EC_{50}$—0.75 p.p.m.; granary weevil—100% control at 1,000 p.p.m.; confused flour beetle—94% control at 10 p.p.m. |
| 4 | 0.006 | |
| 5 | 0.12 | Granary weevil—100% control at 1,000 p.p.m.; confused flour beetle—94% control at 1,000 p.p.m. |
| 6 | 5.0 | |
| 7 | 5.0 | |
| 8 | 2.8 | |
| 9 | 1.1 | |
| 10 | 0.0013 | Mosquito $EC_{50}$—0.62 p.p.m. |
| 11 | 0.056 | |
| 12 | 0.42 | |
| 13 | 0.018 | Mosquito $EC_{50}$—0.37 p.p.m. |
| 14 | 3.5 | |
| 15 | 0.31 | |
| 16 | 0.68 | |
| 17 | 2.2 | |
| 18 | 3.0 | |
| 19 | 0.42 | |
| 20 | 0.065 | |

Insecticidal compositions can be prepared by mixing an effective amount of one or more of the compounds in a suitable carrier depending on the particular mode of application. They can be made up in various forms customary in insect pest control, such as emulsions, suspensions, solutions, powders and aerosols. In general, such preparations can in addition to the active ingredient contain the customary auxiliary agents. The compound according to the invention can be the only active ingredient, but can be processed also together with one or more other agents which have more or less the same type of purpose. The additives used can be organic solvents, such as sesame oil, solvents of the xylene type, petroleum fractions, etc.; water; emulsifiers; surfactants; talcum, pyrophyllite, kieselguhr, gypsum and/or clay; propellants such as dichlorodifluoromethane, etc. The concentration of active material in such preparations can vary within wide limits, but in general should not be much higher than about 15% based on the total weight of the preparation. Preferably the concentration should be about 0.1 to about 1.0% by weight of the total composition.

CLAIMS

The embodiments of the invention in which an exclusive property or privilege is claimed are defined as follows:

1. A compound of the formula

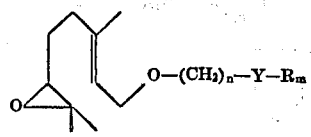

wherein
$n$ is 0 to 3;
Y is a 5- or 6-membered divalent ring having 2 non-adjacent oxygen atoms and 3 or 4 carbon atoms;
R is hydrogen, alkyl, perchloroalkyl, or alkoxy each having up to 4 carbon atoms; and $m$ is 1.

2. The compound of Claim 1 in which $n=1$,

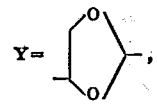

$R = CH_3$; 2-methyl-4(6,7 - epoxygeranyloxymethyl)-1,3-dioxolane.

3. The compound of Claim 1 in which $n=0$,

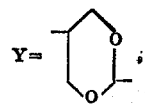

$R = C_2H_5$; 2-ethyl-5-(6,7-epoxygeranyloxy)-1,3-dioxane.

4. The compound of Claim 1 in which $n=1$,

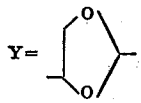

$R = C_2H_5$; 2-ethyl-4-(6,7 - epoxygeranyloxymethyl)-1,3-dioxolane.

References Cited
FOREIGN PATENTS
2,148,183    4/1972    Germany.

DONALD G. DAUS, Primary Examiner

J. H. TURNIPSEED, Assistant Examiner

U.S. Cl. X.R.
260—327, 340.9, 345.9, 347.8; 424—278, 285